UNITED STATES PATENT OFFICE.

JAMES F. MUNSIE, OF BROOKLYN, ASSIGNOR TO THOMAS L. COLES, OF NEW YORK, N. Y.

INSULATING COMPOUND.

SPECIFICATION forming part of Letters Patent No. 426,202, dated April 22, 1890.

Application filed January 17, 1890. Serial No. 337,246. (No specimens.)

*To all whom it may concern:*

Be it known that I, JAMES F. MUNSIE, a British subject, residing at Brooklyn, in the county of Kings and State of New York, have invented certain new and useful Improvements in Insulating Compounds; and I do hereby declare the following to be a full, clear, and exact description of the invention, such as will enable others skilled in the art to which it appertains to make and use the same.

My invention relates to a certain new and useful compound or composition of matter adapted to be conveniently formed or molded under pressure into articles of suitable shape having great strength and durability and having high insulating properties, while at the same time being both water-proof and fire-proof, whereby it is especially appropriate to many uses in connection with the electrical arts and particularly in connection with the construction of conduits or ducts for electrical conductors, insulating-linings for such conduits, switch-boards, and the like.

The basis of my improved compound consists, primarily, of a paper-pulp, of wood or other fiber, rendered non-inflammable by suitable treatment and mixed with refractory earths—such as fire-clay and Portland cement—and with non-inflammable agglutinating materials—such as white glue and silicate of soda—the article after its formation from these ingredients being caused to absorb by immersing or otherwise a waterproofing composition.

In carrying my invention into effect I have found it practicable to proceed as follows: I first take a paper-pulp, or pulp of wood or other fiber, and thoroughly wash or boil the same in a solution of common salt, sulphate of aluminum, and sulphate of zinc until the entire mass of pulp is completely impregnated with said solution. The proportions of the several ingredients of this preliminary bath should be two and one-half pounds of salt and three ounces each of sulphate of aluminum and sulphate of zinc to every three gallons of water. The solution after having acted upon the pulp is then drained off and an equal part, by weight, of finely-pulverized fire-clay and an equal part, by weight, of finely-pulverized Portland cement are added to it, together with a sufficient quantity of white glue and silicate of soda to agglutinate and combine the whole. An intimate homogeneous admixture of these constituent parts is secured by mechanical agitators or mixers. The mixture thus obtained is thereupon placed in molds and subjected to heavy pressure. The molded articles are thereupon thoroughly dried in a suitable oven, and while still hot are immersed in a hot bath of india-rubber or of fire-proof paint (known commercially as "mineral paint.") The hot liquid is absorbed in large quantity by the heated mass of the article plunged into it, and any existing pores are filled, thereby rendering the article thoroughly water-proof. In order (when rubber is employed) to render said rubber non-inflammable, the article may be thereafter subjected to the ordinary vulcanizing process.

The article made in accordance with the procedure described is of great strength and compactness and of superior insulating properties, besides being composed of constituents of comparatively moderate cost, and capable of ready manipulation.

Having thus described my invention, what I claim is—

1. A new composition of matter, consisting of non-inflammable paper-pulp, refractory earth, and a non-inflammable agglutinating or binding agent, substantially as described.

2. A new composition of matter, consisting of paper-pulp, refractory earth, a non-inflammable agglutinating or binding agent, and a non-inflammable waterproofing agent, substantially as described.

3. A new composition of matter, consisting of paper-pulp, fire-clay, Portland cement, white glue, and silicate of soda, substantially as described.

4. A new composition of matter, consisting of paper-pulp, fire-clay, Portland cement, white glue, silicate of soda, and a non-inflammable waterproofing agent, substantially as described.

In testimony whereof I affix my signature in presence of two witnesses.

JAMES F. MUNSIE.

Witnesses:
JOHN C. PENNIE,
A. M. PARKINS.